US009688418B2

(12) United States Patent
Neb et al.

(10) Patent No.: US 9,688,418 B2
(45) Date of Patent: Jun. 27, 2017

(54) METHOD FOR DETERMINING A STATE OF A COMPONENT IN A HIGH LIFT SYSTEM OF AN AIRCRAFT, HIGH LIFT SYSTEM OF AN AIRCRAFT, AND AIRCRAFT HAVING SUCH A HIGH LIFT SYSTEM

(71) Applicant: Airbus Operations GmbH, Hamburg (DE)

(72) Inventors: Eugen Neb, Hamburg (DE); Jan-Arend Van Bruggen, Hamburg (DE); Michael Brady, Hamburg (DE); Joerg Wyrembek, Hamburg (DE); Olivier Criou, Hamburg (DE); Jan Haserodt, Hamburg (DE); Mark Heintjes, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/920,428

(22) Filed: Oct. 22, 2015

(65) Prior Publication Data

US 2016/0114904 A1    Apr. 28, 2016

(30) Foreign Application Priority Data

Oct. 24, 2014  (EP) .................................. 14190333

(51) Int. Cl.
*G01M 17/00*  (2006.01)
*B64D 45/00*  (2006.01)
*B64C 9/20*  (2006.01)
*B64C 13/16*  (2006.01)
*B64C 9/16*  (2006.01)

(52) U.S. Cl.
CPC ............. *B64D 45/0005* (2013.01); *B64C 9/20* (2013.01); *B64C 13/16* (2013.01); *B64D 2045/001* (2013.01)

(58) Field of Classification Search
CPC ............. B64D 4/50; B64C 9/16; G01M 17/00
USPC .................................... 701/3, 33.9; 244/213
See application file for complete search history.

(56) References Cited

U.S. PATENT DOCUMENTS 6,466,141 B1 * 10/2002 McKay .................. B64C 13/00
                                                              244/213
6,824,099 B1 * 11/2004 Jones ...................... B64C 13/28
                                                              244/203
(Continued)

FOREIGN PATENT DOCUMENTS

CN        104071330 A     10/2014
DE    102010047512 A1      4/2012
(Continued)

OTHER PUBLICATIONS

European Patent Office, European Search Report for European Patent Application No. 14190333.6 mailed Apr. 16, 2015.
(Continued)

*Primary Examiner* — Tan Q Nguyen
(74) *Attorney, Agent, or Firm* — Lorenz & Kopf, LLC

(57) ABSTRACT

A method for determining a state of a component in a high lift system of an aircraft is proposed, the high lift system comprising a central power control unit for providing rotational power by means of a transmission shaft; and drive stations coupled with the power control unit and movable high lift surfaces.

15 Claims, 3 Drawing Sheets

(56) References Cited

U.S. PATENT DOCUMENTS

| | | | | |
|---|---|---|---|---|
| 7,048,234 B2* | 5/2006 | Recksiek | ............. | B64C 13/503 244/213 |
| 2005/0151028 A1* | 7/2005 | Pohl | ........................ | B64C 13/26 244/213 |
| 2010/0100355 A1* | 4/2010 | Marx | ................. | B64D 45/0005 702/183 |
| 2012/0091282 A1* | 4/2012 | Spiller | ...................... | B64C 9/16 244/213 |
| 2014/0138480 A1 | 5/2014 | Richter | | |
| 2014/0297102 A1* | 10/2014 | Moy | ..................... | B64D 45/00 701/33.9 |

FOREIGN PATENT DOCUMENTS

| | | | |
|---|---|---|---|
| EP | 0922633 | A2 | 6/1999 |
| EP | 1088753 | A2 | 4/2001 |
| EP | 2783988 | A1 | 10/2014 |
| WO | 2005047108 | A1 | 5/2005 |

OTHER PUBLICATIONS

European Patent Office, European Search Report for European Patent Application No. 14190333.6 mailed Apr. 22, 2015.
Chinese Patent Office, Chinese Office Action for Chinese Patent Application No. 201510702400.1 mailed Feb. 28, 2017.

* cited by examiner intact one station disconnected position anomaly intact one station disconnected flap twist (skew)

METHOD FOR DETERMINING A STATE OF A COMPONENT IN A HIGH LIFT SYSTEM OF AN AIRCRAFT, HIGH LIFT SYSTEM OF AN AIRCRAFT, AND AIRCRAFT HAVING SUCH A HIGH LIFT SYSTEM

CROSS-REFERENCE TO RELATED APPLICATIONS

This application claims priority to European Patent Application No. 14 190 333.6, filed 24 Oct. 2014, which is incorporated herein by reference in its entirety.

The embodiments described herein relate to a method for determining a state of a component in a high lift system of an aircraft, a high lift system of an aircraft, as well as an aircraft having such a high lift system.

BACKGROUND

A high lift system of an aircraft serves the purpose of lift and drag management. A high lift system is often composed of a leading edge slat system and a trailing edge flap system. Many flap systems in civil and military aircraft are equipped with a central drive unit, which is also known as power control unit (PCU), which drives a transmission shaft train and local mechanical actuator devices, the so-called drive stations, on corresponding flap support stations of the movable flaps. The high lift settings are selectable by a cockpit crew through a flaps lever, through which a flap angle is selectable.

Such a transmission system provides a load path from the central drive unit to all actuator outputs, leading to a symmetrical deployment of all flap devices. Flap kinematics transform a rotary motion driven by the drive station into a required surface movement.

A high lift flap system is often controlled and monitored by control computers, the so-called flap channel of the slat flap control computers (SFCC). System drive commands primarily originate from the flaps lever input. The surfaces will be driven to predetermined positions (flap settings) that are laid down in the software of the respective control computer. For achieving a high accuracy in driving the flap devices to the predetermined positions, flap drive system positions are continuously fed back/monitored by a feedback position pick-off unit (FPPU) attached to the drive unit and fitted with an internal gearbox to dedicate an equivalent system angle.

Further sensors are dedicated to system failure monitoring such as station position pick-off units (SPPU), which are connected to individual drive stations to dedicate an equivalent angle for each station for system monitoring purposes.

Flap attachment monitoring is useful for detecting a potentially abnormal state of a driven flap. Commonly, each flap is driven by two stations and the position of these two stations are monitored by two independent station position pick-off units. The above-mentioned control computer may be provided with a flap skew monitoring for detecting an abnormal flap twist (skew). In case a predetermined skew threshold is exceeded, the control computer may interrupt the operation of the flap system.

In addition, other objects, desirable features and characteristics will become apparent from the subsequent summary and detailed description, and the appended claims, taken in conjunction with the accompanying drawings and this background.

SUMMARY

With an increasing stiffness of flaps or other aerodynamic surfaces driven in a high lift system, the above-mentioned predetermined skew threshold needs to be reduced, as skew effects arising from attachment disconnections are decreased. At the same time, the accuracy requirements of associated sensors needs to be increased in order to maintain a certain monitoring robustness. However, increasing the sensor accuracy results in increased development and manufacturing costs.

It is therefore an object to propose a method for determining the state of a component in a high lift system of an aircraft with a high robustness, reliability and accuracy, which method is conductible under use of sensors without increased accuracy.

A method for determining a state of a component in a high lift system of an aircraft is proposed. The high lift system comprises a central power control unit for providing rotational power by means of a transmission shaft, and drive stations coupled with the power control unit and movable high lift surfaces. The method comprises the steps of acquiring in an extended position in flight at least one first position of a first position pick-off unit coupled with the component, which is mechanically coupled with one of the high lift surfaces, and which is coupled with one of the drive stations, acquiring on ground at least one second position of the first position pick-off unit in the extended position, determining a deviation between a measure based on the first position and an associated measure based on the second position of the first position pick-off unit between ground and flight, determining, whether the deviation exceeds a predetermined threshold, and generating a signal indicating an abnormal state of the component in case the deviation exceeds the predetermined threshold.

The method further provides the ability to determine a state of a component in the previously described high lift system. Exemplarily, the state of the component may be differentiated between "fully operative" or "faulty". This means, the method is able to at least provide a feedback whether the respective component may be operated without causing mechanical damages to the component itself or to associated components, such as drive stations or the such. The signal generated by the method may be used for interrupting the operation of at least a part of the high lift system that includes the faulty component.

The component may be one of a high lift surface itself, a transmission system, a drive station or any component integrated in the drive station or coupled with the drive station, such as a lever or a chain of levers, wherein in the context of the high lift system mentioned above a high lift surface is driven by two drive stations, which are arranged at a distance to each other. Preferably, the high lift surface comprises two edges that each comprise a section mechanically coupled with a single drive station each.

The positions acquired by the first position pick-off unit and the second position pick-off unit may preferably be rotational positions under use of rotational sensors. However, also distance information may be acquired through the use of different sensors.

A rotational position of a first (station) position pick-off unit on ground and during flight in the same extended position is measured, i.e. the same configuration, which means with the same commanded extension position. In case of a disconnection of a drive station of the respective high lift surface, this high lift surface is held by the remaining (second) station. As the second station needs to maintain the position of the high lift flap alone and is faced with the whole air load, it may be slightly pushed into a direction nearer to the wing, i.e. a retraction direction. The edge of the high lift surface, which is faced with the disconnected drive station, will be pushed further into a retraction position through the air load. Hence, the measurable magnitude consists of a deformation at an intact second station and the twist of the high lift surface. Due to the resulting increase in magnitude between flight and ground, the required sensor accuracy may be lower than required for simply measuring the twist alone, which may be reduced due to a high stiffness of the high lift surface.

In this regard, the measure based on the first or the second position may be realized by different parameters. For example, a rotational position of the first position pick-off unit may be measured as a number of rotations, which has been accomplished by the first position pick-off unit during the extension movement. It may be transformed into an extension distance or into a position difference based on the position of the first drive station and another component. The gist is focused on the comparison of geometrical parameters of a flap in two completely contrary operating states of the aircraft. The actual absolute measure is not of a particular relevance, as is the relation of a measure in two different operation conditions.

Further, it is noted that conducting the measuring on ground does not necessarily have to happen directly after measuring in flight. It may also be particularly advantageous if the measuring on ground is done before each flight, periodically or at various, selected points in time. The order of the steps in the method is therefore arbitrary.

Still further, a plurality of demanded extension positions or configurations may be included in the measuring on ground, e.g. exemplary positions, which are commonly used during flight may be pre-measured on ground.

For improving the accuracy of the method, different filters and algorithms may be used for the measurements in flight and on ground, such as searching for the maximum, minimum or mean value during or within a certain time. Still further, an electronic calibration may be introduced in addition. During the calibration, the control unit determines the characteristics of the system by measuring each station position pick-off unit at given flap positions. Such a calibration run may be performed automatically once on ground or in flight. Stored values may be used during the above method and eliminates system build tolerances (systematic errors).

Comparing the method with common methods reveals at least the following advantages. Inaccuracies effected by aging may be reduced to a comparably small time span between flight and ground measurement. Inaccuracies effected by temperature may be reduced to a maximum temperature difference between flight and ground measurement. Further, any inaccuracies effected by the altitude during flight may be reduced by measuring in flight only at a specific altitude. Any inaccuracies effected by mechanical tolerances, e.g. of a station position pick-off unit, may be reduced due to elimination of systematic errors by flight and ground measurement or the electronic calibration. Using the proposed method enables the use of standard sensor accuracies, which leads to economization of development costs, time and risk when introducing new sensor technology. Further, the method according to the embodiment leads to a significant improvement of monitor robustness avoiding nuisance monitor tripping. A disconnect failure may also be dedicated to a specific station without additional checks and in case of at least one embodiment, one SPPU sensor is sufficient for detecting disconnects at a specific station.

To sum up, the method provides an excellent way in monitoring a component in a high lift system of an aircraft without requiring excessively accurate sensors. The threshold could be determined as a fixed value or as a function of speed, flight phase, altitude, flap configuration or spoiler position.

In an advantageous embodiment, the measure based on the first position is proportional to the first position and the measure based on the second position is proportional to the second position. For example, a rotational position may be transformed into an extension distance through multiplication with geometrical and/or gear specific factors. Hence, the measured positions are directly fed back into comparing the states of flight and ground operation. The state of the relevant component may be determined based on measuring the positions of only one station of the high lift surface alone.

In another exemplary embodiment, determining the deviation comprises calculating the difference between the measure based on the first position and the measure based on the second position. By subtracting these measures, a numerical value results, which may easily be compared with a threshold in the form of a numerical value, too. In case the absolute value determined in the subtraction exceeds the absolute value of the threshold, the above mentioned signal is to be created.

A still further embodiment further comprises acquiring in flight at least one third position of a second position pick-off unit, which second position pick-off unit is coupled with the same high lift surface as the first position pick-off unit, acquiring on ground at least one fourth position of the second position pick-off unit in the extended position, wherein the measure based on the first position is a first twist of the high lift surface in flight, which first twist is the difference of the first position and the third position, wherein the measure based on the second position is a second twist of the high lift surface in flight, which second twist is the difference of the second position and the fourth position. Resultantly, the deviation is the difference between the first twist and the second twist. In this embodiment, two different twist situations are compared to one another. As explained above, a twist in flight may be different than a twist on the ground, due to the flight or air loads urging an intact station into a retraction direction. Hence, a twist on ground may significantly differ from a twist in flight, indicating an abnormal state of the component, thereby allowing a precise determination of an abnormal state.

As previously indicated, measuring the at least one second position may comprise measuring a plurality of second positions, which plurality of second positions is stored in a memory. Depending on the actual intended position of the component, a corresponding second position may be retrieved from the memory, thereby allowing to determine the state of the component during flight for at least a plurality of different intended positions.

Still further, measuring the at least one second position is conducted before flight. This may be before each flight or periodically before every second, third, fourth or, in general, in flight. This allows to periodically recalibration of the high lift system to consider and compensate ageing effects or the such.

It is further indicated that a control unit, which may be a flight control computer, the slat flap control computer or any other unit, an algorithm stored and executed in the slat flap control computer or a separate control unit may be adapted for retrieving these second positions and, furthermore, may be adapted for providing interpolated data between single measured points, while the deviation may be determined based on these interpolated data.

It goes without saying that the comparison of twist on ground and in flight may also be based on a plurality of previously saved or stored rotational positions, i.e. the fourth positions, which may also be interpolated if necessary.

The embodiments described herein further relate to a high lift system for an aircraft, a central power control unit for providing rotational power by means of a transmission shaft, at least one high lift surface, each coupled with at least two drive stations, which drive stations being coupled with the power control unit, at least one control unit coupled with the central power control unit, and a first position pick-off unit mechanically coupled with one of the at least two drive stations. The control unit is adapted for acquiring in an extended position in flight at least one first position of a first position pick-off unit coupled with one of the high lift surfaces and one of the at least two drive stations; acquiring in the extended position on ground at least one second position of the first position pick-off unit; determining a deviation between a measure based on the first position and an associated measure based on the second position of the first position pick-off unit between ground and flight; determining, whether the deviation exceeds a predetermined threshold; and generating a signal indicating an abnormal state of the component in case the deviation exceeds the predetermined threshold.

In an advantageous embodiment, the high lift system further comprises a second position pick-off unit coupled with another one of the at least two drive stations, which second position pick-off unit is coupled with the same high lift surface as the first position pick-off unit. The control unit is adapted for acquiring in flight at least one third position of the second position pick-off unit and for acquiring at least one fourth position of the second position pick-off unit in the extended position on ground. The measure based on the first position is a first twist of the high lift surface in flight, which first twist is the difference of the first position and the third position. The measure based on the second position is a second twist of the high lift surface in flight, which second twist is the difference of the second position and the fourth position. Resultantly, the deviation is the difference between the first twist and the second twist.

Still further, the high lift system may comprise a memory, wherein the control unit is adapted for measuring a plurality of second positions and for storing the plurality of second positions in the memory.

The control unit may also be adapted for retrieving a previously measured second position from the memory before determining the deviation.

Still further, the embodiment relates to an aircraft having such a high lift system.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
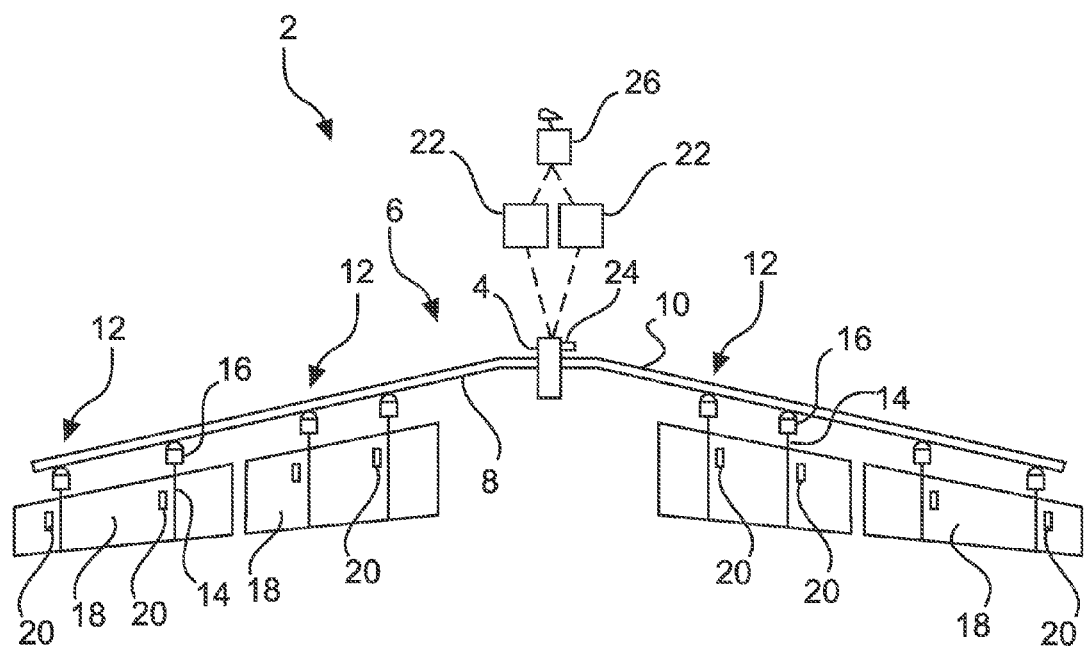
FIG. 1 shows a high lift flap system capable of conducting the method in a schematic, block-oriented view.

In FIG. 1, a general setup of a high lift system 2 is shown. Here, a power control unit 4 is coupled with a transmission shaft system 6 comprising a left transmission shaft 8 and a right transmission shaft 10. These are coupled with drive stations 12 distributed along the transmission shafts 8 and 10 along a trailing edge section of a wing, which is not depicted in FIG. 1.

Each drive station 12 exemplarily comprises a spindle 14 as well as a nut 16, which is moved along the spindle 14 through the spindle rotation. Each of a plurality of high lift surfaces, which are shown as flap 18, is exemplarily coupled with two drive stations 12 and comprises two station position pick-off units 20. Both drive stations 12 are arranged at a distance to each other, exemplarily at two opposite lateral flap ends. Usually, two redundant flap control computers 22, which both may also be referred to as a control unit in the light of the embodiment, which flap control computers 22 are coupled with the PCU 4 and the station position pick-off units 20.

Furthermore, a feedback position pick-off unit 24 is coupled to the flap control computers 22 and allows the determination of an actual rotational position of the transmission shaft system 6, leading to the ability to determine the position of the flaps 18, which depends on the rotational position of the transmission shaft system 6. A flaps lever 26 provides an input into the flap control computers 22, which then drive the power control unit 4 such that the actually determined rotational position of the transmission shaft system 6 equals the commanded angle.

The feedback position pick-off unit 24 may comprise an internal gear, which is not depicted in FIG. 1. The same applies to the station position pick-off units 20.

Figure 2A:
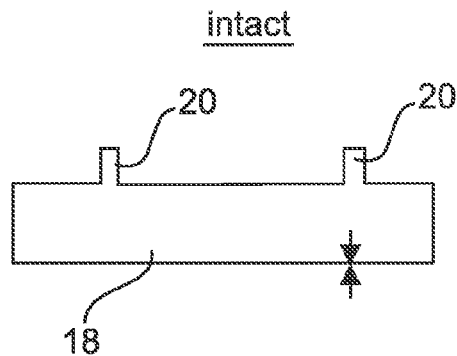
FIGS. 2A and 2B show a single high lift flap surface and a measure at a single drive station, wherein the deviation of a position on ground and in flight is determined.

FIG. 2A shows a flap having two intact drive stations 20. The difference between an extended position in flight and an extended position on ground is marginal for both drive stations, such that a predetermined threshold is clearly not exceeded.

Figure 2B:
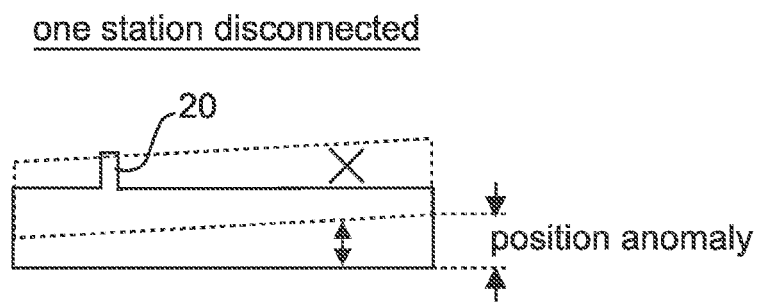

However, in FIG. 2B, the right (second) drive station 20 has a failure, while the left (first) drive station 20 is intact, such that the associated right part of the flap 18 is not extended by the second drive station 20. Hence, while the first drive station 20 drives the associated left part of the flap 18, a skew arises.

The position acquired by the second drive station 20 in flight differs from the position acquired by the second drive station 20 on ground, as air load acting on the flap 18 urges the part of the flap 18 associated with the second drive station 20 into the retraction direction. Hence, by subtracting the position acquired by the second drive station 20 in flight from the position acquired by the second drive station 20 on ground, a position deviation is determined, which is indicated with a position anomaly in FIG. 2B that is (almost) zero in FIG. 2A with two intact drive stations 20. The deviation may then be compared to a predetermined threshold. In case it exceeds the threshold, a signal is generated indicating an abnormal state.

Figure 3A:
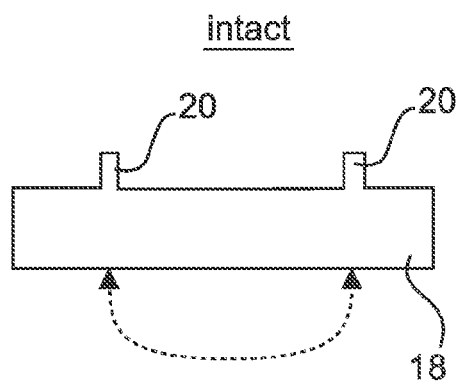
FIGS. 3A and 3B show a single high lift flap surface and a measure at two drive stations, wherein the deviation of a twist on ground and in flight is determined

In FIG. 3A it is indicated that also the twist in an extended position in flight may be compared to the twist in an extended position on ground. In FIG. 3A, an intact flap 18 is shown, which comprises basically the same twist that will most likely be around zero, in both flight states, such that a deviation may not occur or lie within a predetermined threshold.

Figure 3B:
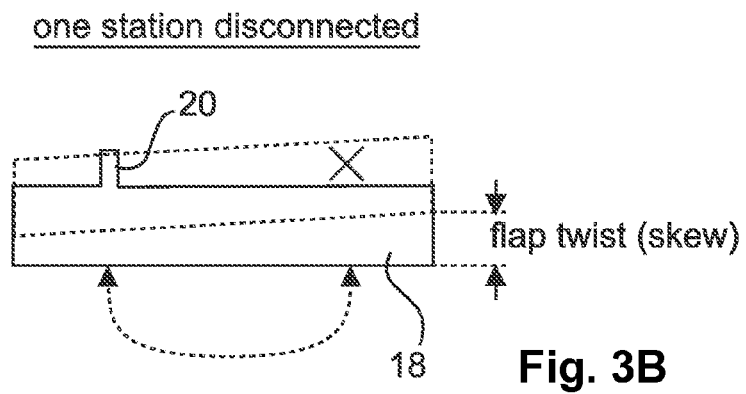

However, FIG. 3B shows a disconnected second station 20, leading to a clear twist, which differs in both flight states as mentioned above. By comparing both twist values, an abnormal state may simply be detected. This is indicated by the flap twist (skew) in FIG. 3B. In case this value exceeds the threshold, the signal is generated.

Figure 4:
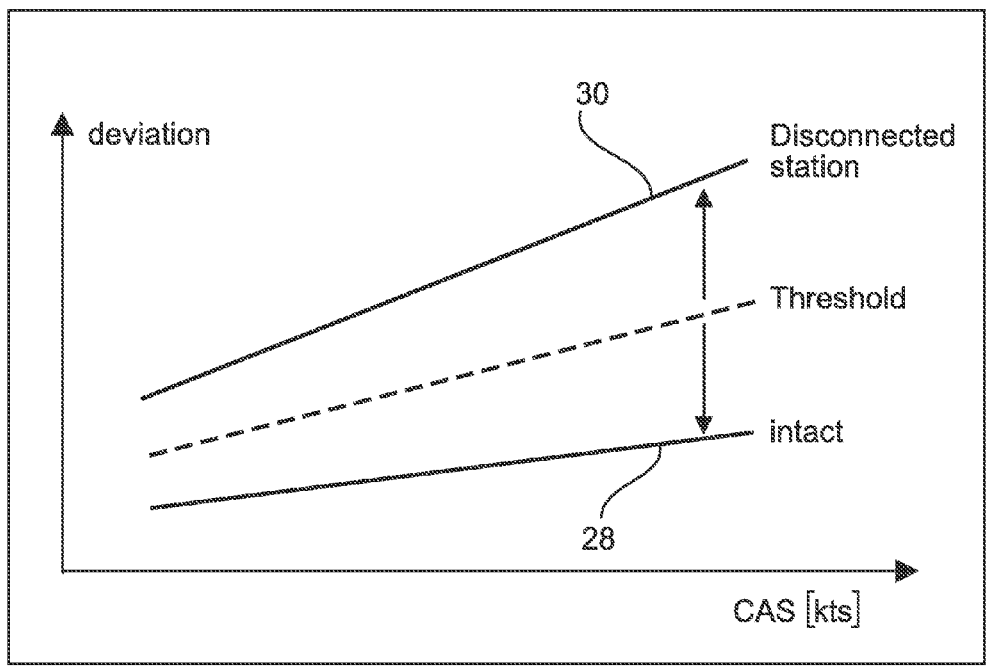
FIG. 4 shows a dependency between determined deviation, threshold and flight speed.

Finally, FIG. 4 demonstrates that a predetermined threshold may be selected depending on the speed of the aircraft. As the air loads rise with the speed, a larger tolerance should be allowed for a determination of the deviation of both measures. In the graph shown in FIG. 4 the possible deviation 28 for an intact system may increase with the computed air speed (CAS), e.g. proportionally. Hence, also the determinable deviation 30 of a defect system may increase accordingly. Consequently, a threshold 32 may be selected between both curves, which may result in a proportional dependency of the threshold with the air speed.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method for determining a state of a component in a high lift system of an aircraft, the high lift system comprising a central power control unit for providing rotational power by means of a transmission shaft; and drive stations coupled with the power control unit and movable high lift surfaces; the method comprising the steps of:
   acquiring in an extended position in flight at least one first position of a single first position pick-off unit coupled with the component, which is mechanically coupled with one of the high lift surfaces, and which is coupled with one of the drive stations,
   acquiring on ground at least one second position of the single first position pick-off unit in the extended position,
   determining a deviation between a measure based on the first position and an associated measure based on the second position of the single first position pick-off unit between ground and flight,
   determining, whether the deviation exceeds a predetermined threshold, and
   generating a signal indicating an abnormal state of the component in case the deviation exceeds the predetermined threshold.

2. The method of claim 1,
   wherein the measure based on the first position is proportional to the first position, and
   wherein the measure based on the second position is proportional to the second position.

3. The method of claim 1, wherein determining the deviation comprises calculating the difference between the measure based on the first position and the measure based on the second position.

4. The method of claim 1,
   further comprising acquiring in flight at least one third position of a second position pick-off unit, which second position pick-off unit is coupled with the same high lift surface as the single first position pick-off unit,
   acquiring on ground at least one fourth position of the second position pick-off unit in the extended position,
   wherein the measure based on the first position is a first twist of the high lift surface in flight, which first twist is the difference of the first position and the third position,
   wherein the measure based on the second position is a second twist of the high lift surface on ground, which second twist is the difference of the second position and the fourth position,
   wherein the deviation is the difference between the first twist and the second twist.

5. The method of claim 1, wherein measuring the at least one second position comprises measuring a plurality of second positions, which plurality of second positions is stored in a memory.

6. The method of claim 5, further comprising retrieving a previously measured second position from the memory before determining the deviation.

7. The method of claim 5, wherein measuring the at least one second position is conducted directly or periodically before flight.

8. A high lift system for an aircraft, comprising:
   a central power control unit for providing rotational power by means of a transmission shaft,
   at least one high lift surface, each coupled with at least two drive stations, which drive stations being coupled with the power control unit,
   at least one control unit coupled with the central power control unit, and
   a single first position pick-off unit mechanically coupled with one of the at least two drive stations,
   wherein the control unit is adapted for acquiring in an extended position in flight at least one first position of the single first position pick-off unit coupled with one of the high lift surfaces and one of the at least two drive stations, acquiring in the extended position on ground at least one second position of the single first position pick-off unit, determining a deviation between a measure based on the first position and an associated measure based on the second position of the single first position pick-off unit between ground and flight, determining, whether the deviation exceeds a predetermined threshold and generating a signal indicating an abnormal state of the component in case the deviation exceeds the predetermined threshold.

9. The high lift system of claim 8,
further comprising a second position pick-off unit coupled with another one of the at least two drive stations, which second position pick-off unit is coupled with the same high lift surface as the single first position pick-off unit,
wherein the control unit is adapted for acquiring in flight at least one third position of the second position pick-off unit, for acquiring at least one fourth position of the second position pick-off unit in the extended position on ground,
wherein the measure based on the first position is a first twist of the high lift surface in flight, which first twist is the difference of the first position and the third position,
wherein the measure based on the second position is a second twist of the high lift surface on ground, which second twist is the difference of the second position and the fourth position, and
wherein the deviation is the difference between the first twist and the second twist.

10. The high lift system of claim 8,
further comprising a memory,
wherein the control unit is adapted for measuring a plurality of second positions and for storing the plurality of second positions in the memory.

11. The high lift system of claim 10, wherein the control unit is adapted for retrieving a previously measured second position from the memory before determining the deviation.

12. An aircraft, including a wing and a high lift system, comprising:
a central power control unit for providing rotational power by means of a transmission shaft,
at least one high lift surface, each coupled with at least two drive stations, which drive stations being coupled with the power control unit,
at least one control unit coupled with the central power control unit, and
a single first position pick-off unit mechanically coupled with one of the at least two drive stations,
wherein the control unit is adapted for acquiring in an extended position in flight at least one first position of the single first position pick-off unit coupled with one of the high lift surfaces and one of the at least two drive stations, acquiring in the extended position on ground at least one second position of the single first position pick-off unit, determining a deviation between a measure based on the first position and an associated measure based on the second position of the single first position pick-off unit between ground and flight, determining, whether the deviation exceeds a predetermined threshold and generating a signal indicating an abnormal state of the component in case the deviation exceeds the predetermined threshold.

13. An aircraft, a wing, and a high lift system of claim 12
further comprising a second position pick-off unit coupled with another one of the at least two drive stations, which second position pick-off unit is coupled with the same high lift surface as the single first position pick-off unit,
wherein the control unit is adapted for acquiring in flight at least one third position of the second position pick-off unit, for acquiring at least one fourth position of the second position pick-off unit in the extended position on ground,
wherein the measure based on the first position is a first twist of the high lift surface in flight, which first twist is the difference of the first position and the third position,
wherein the measure based on the second position is a second twist of the high lift surface in flight, which second twist is the difference of the second position and the fourth position, and
wherein the deviation is the difference between the first twist and the second twist.

14. An aircraft, a wing, and a high lift system of claim 13,
further comprising a memory,
wherein the control unit is adapted for measuring a plurality of second positions and for storing the plurality of second positions in the memory.

15. An aircraft, a wing, and a high lift system of claim 14,
wherein the control unit is adapted for retrieving a previously measured second position from the memory before determining the deviation.

* * * * *